United States Patent [19]

Hikino et al.

[11] 3,807,043

[45] Apr. 30, 1974

[54] METHOD FOR MAKING MAGNETIC HEAD COMPOSED OF FERRITE

[75] Inventors: Tadashi Hikino; Masanari Mikoda; Shigeru Hayakawa; Mikio Higashi; Akio Yamauchi; Koichi Kawata; Sadao Masuoka, all of Osaka, Japan

[73] Assignee: Matsushita Electric Industrial Co., Ltd., Osaka, Japan

[22] Filed: June 18, 1973

[21] Appl. No.: 370,755

Related U.S. Application Data

[63] Continuation of Ser. No. 148,021, May 28, 1971, abandoned.

[30] Foreign Application Priority Data

| | | |
|---|---|---|
| June 2, 1970 | Japan | 45-48326 |
| June 2, 1970 | Japan | 45-48333 |
| June 2, 1970 | Japan | 45-48336 |

[52] U.S. Cl. .......... 29/603, 179/100.2 C

[51] Int. Cl. .......... G11b 5/42

[58] Field of Search .......... 29/603; 179/100.2 C; 340/174.1 F; 346/74 MC

[56] References Cited

UNITED STATES PATENTS

| | | | |
|---|---|---|---|
| 3,605,259 | 9/1971 | Tawara et al. | 29/603 |
| 3,577,634 | 5/1971 | Secrist | 29/603 |
| 3,688,056 | 8/1972 | Wisely et al. | 29/603 X |
| 3,458,926 | 8/1969 | Maissel et al. | 29/603 |

*Primary Examiner*—Charles W. Lanham
*Assistant Examiner*—Carl E. Hall
*Attorney, Agent, or Firm*—Wenderoth, Lind & Ponack

[57] ABSTRACT

A method for making a circular magnetic head having at least two head members composed of ferrite and an effective gap between the members, each of the members having at least one gap surface. The gap surface on each of the head core members is first polished, and then a glass powder layer is adhered to the polished gap surface of one of the head members. The glass powder layer is fixed at a glass layer forming temperature to form a glass layer which adheres to the polished gap surface and which has a thickness substantially equal to the desired gap dimension. The one head member is then joined to the other head core member at the polished gap surface. A piece of glass having a softening temperature lower than that of the glass layer is placed on the joint area of the two head core members at the surface opposite to the head surface and the two joined head members are fired at a temperature lower than the glass layer forming temperature to melt the piece of glass, whereby the melted piece of glass acts, upon hardening, as a bonding agent for the two joined head members.

7 Claims, 8 Drawing Figures

INVENTORS
TADASHI HIKINO
MASANARI MIKODA
SHIGERU HAYAKAWA
MIKIO HIGASHI
AKIO YAMAUCHI
KOICHI KAWATA
SADAO MASUOKA

BY Wenderoth, Lind & Ponack
ATTORNEYS

INVENTORS
TADASHI HIKINO
MASANARI MIKODA
SHIGERU HAYAKAWA
MIKIO HIGASHI
AKIO YAMAUCHI
KOICHI KAWATA
SADAO MASUOKA

BY Wenderoth, Lind & Ponack
ATTORNEYS

*INVENTORS*
TADASHI HIKINO
MASANARI MIKODA
SHIGERU HAYAKAWA
MIKIO HIGASHI
AKIO YAMAUCHI
KOICHI KAWATA
SADAO MASUOKA

BY Wenderoth, Lind & Ponack
ATTORNEY

INVENTORS
TADASHI HIKINO
MASANARI MIKODA
SHIGERU HAYAKAWA
MIKIO HIGASHI
AKIO YAMAUCHI
KOICHI KAWATA
SADAO MASUOKA

BY Wenderoth, Lind & Ponack
ATTORNEYS

METHOD FOR MAKING MAGNETIC HEAD COMPOSED OF FERRITE

This application is a continuation of Ser. No. 148,021, filed May 28, 1971 now abandoned.

The present invention relates to a method for making a circular magnetic head having at least two head members composed of ferrite and an effective gap between said members, and more particularly to a method for forming such an effective gap by using finely divided glass particles.

Various literature in the prior art describes methods for making a circular magnetic head having at least two head members composed of ferrite. For example, U.S. Pat. No. 2,919,312 describes a ferrite magnetic head having a magnetic gap filled with a gap filler material which is plate-shaped or in the form of a foil. Two head members composed of ferrite are bonded together by cementing means at the outside of the magnetic gap. In this U.S. Patent, the gap dimension described is about $10\mu$. Therefore, there is no difficulty in finding foil or plate-shaped material of glass, quartz, ceramic material and molybdenum metal having this thickness. However, it is not easy to obtain a foil or plate having a thickness less than $10\mu$.

U.S. Pat. No. 3,145,453 describes a method of interposing a glass shim between two head members composed of ferrite and compressing the two head members against the glass shim at a temperature in the softening temperature range of the glass. The glass shim acts upon hardening as a gap spacer and as a bond for the two head members. It is rather difficult by this method to obtain precisely the desired gap dimension as indicated in U.S. Pat. No. 3,117,368.

A method for making magnetic head core utilizing capillary action is described in U.S. Pat. No. 3,246,383. The magnetic gap between two magnetic head members is filled with a non-magnetic material having a melting point lower than that of ferrite by capillary action. The filler material acts as a spacer for magnetic gap and also a bond. Since the capillary action at high temperature causes a mutual diffusion of non-magnetic gap material and ferrite material, it is very difficult by this method to obtain magnetic gap having a precise dimension.

Recently tape recording techniques have been requiring a magnetic head having a more precise gap dimension and a narrower gap. These requirements have not been completely met by the prior art methods. Therefore a principal object of this invention is to provide a method to meet these requirements.

An object of the present invention is to provide a method for making a magnetic head having a precise gap dimension.

Another object of this invention is to provide a method for making a magnetic head having a narrower gap than heretofore.

These objects are achieved by the method of the present invention for making a circular magnetic head having at least two head core members composed of ferrite and an effective gap between said members, each of said members having at least one gap surface, said method comprising the steps of:

1. polishing the gap surface on said head members;
2. adhering a glass powder layer to the polished gap surface of one of said head members;

3. firing said glass powder layer at a glass layer forming temperature to form a glass layer which adheres to said polished gap surface of said one head member and which has a thickness substantially equal to the desired gap dimension;
4. joining said one head member having the glass powder layer formed on the polished gap surface thereof to another head member at the polished gap surface;
5. placing a piece of glass having a softening temperature lower than that of said glass layer on the joint area of said two head members at the position of the polished gap surfaces; and
6. firing the two joined head members at a temperature lower than said glass layer forming temperature to melt said piece of glass whereby the melted piece of glass acts upon hardening as a bonding agent for said joined two head core members.

Other objects and features of the present invention will be apparent upon consideration of the following description taken together with the accompanying drawings, wherein.

Figure 1:
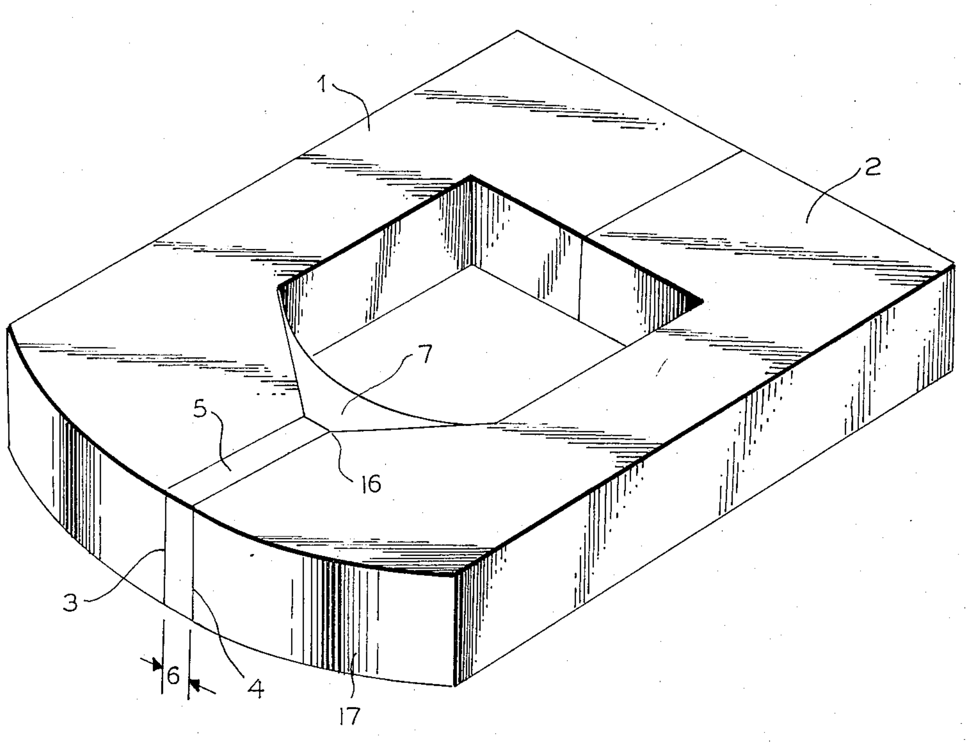
FIG. 1 is a perspective view of a magnetic head according to the present invention.
Figure 2A:
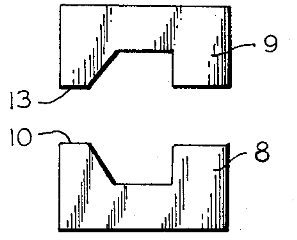
FIGS. 2A–2E show the steps in the method of making a magnetic head according to the present invention.
Figure 2B:
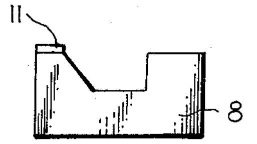
Figure 2C:
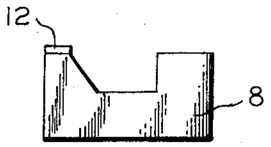
Figure 2D:
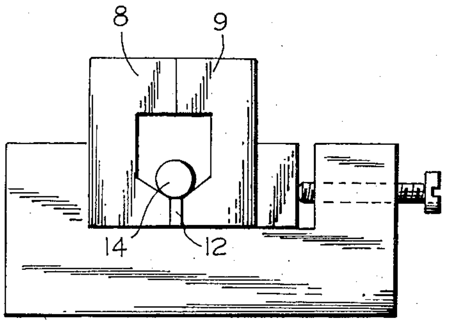
Figure 2E:
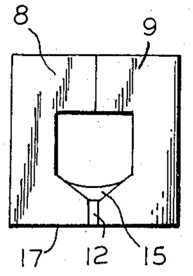

Before proceeding with a detailed description of the method for making a circular magnetic head according to the present invention, the construction of a circular magnetic head core will be explained with reference to FIG. 1, wherein reference characters 1 and 2 designate two head members composed of ferrite material, respectively. Each of said two head members 1 and 2 is polished at one end for formation of a gap surface. Said two head members 1 and 2 have gap surfaces 3 and 4, respectively. A glass gap layer 5 is interposed between the two gap surfaces 3 and 4, and has a thickness substantially equal to the desired gap dimension 6. The joined head core members 1 and 2 are firmly bonded together by a glass bond 7 at a surface opposite the head surface 17 of the magnetic head. Said head members 1 and 2 can have any desired shape and size. It is possible to use any ferrite material suitable for a magnetic head core.

Referring to FIGS. 2A–2E, two head members 1 and 2 having the desired shape and size are fabricated in a well-known manner. Said two head members 8 and 9 have respective gap faces 10 and 13 polished by any suitable and available method. One of said two members 8 and 9, for example, head member 8 is provided, at said gap surface 10, with a glass powder layer 11 having a thickness substantially equal to the desired gap dimension. The exact manner of providing said glass powder layer 11 will be explained hereinafter in accordance with the present invention. The next step is to fire said glass powder layer 11 at a glass forming temperature for formation of glass gap layer 12 which adheres to said polished gap surface 10, and then to cool it to room temperature. Said glass gap layer 12 is composed of a uniform glass film having a thickness substantially equal to the desired gap dimension. The other head member 9 is joined, at room temperature, with said head member 8 having said glass gap layer 12 formed on said gap surface 10. Any available and suitable method can be used to hold the two head members 8 and 9 joined together at said gap surfaces 10 and 13. One such method is to place against the joint between said two joined head members 8 and 9 inside of said annular head at the surface opposite the head surface 17, a piece of glass 14 having a softening temperature lower than that of said glass powder forming the gap layer 12. The final step is to fire the joined head members 8 and 9 at a temperature lower than the forming temperature of the glass powder forming said glass gap layer so as to melt said piece of glass without melting the glass gap layer 12, whereby the melted piece of glass 15, upon hardening, acts as a bonding agent for said joined head members 8 and 9.

The particle size of the glass which forms said glass powder layer 11 has an effect on the formation of said glass gap layer 12; it is preferable that the particle size of said glass powder layer 11 is not substantially greater than the desired gap dimension. For example, a gap dimension of about $1\mu$ can be formed satisfactorily by using powdered glass having a particle size not substantially greater than $1\mu$. One practical method for forming said glass powder layer 11 is to deposit finely divided glass particles dispersed in a liquid medium on said gap surface 10. Said liquid medium can be any available and suitable liquid, such as ethyl acetate, ethyl alcohol, and combinations thereof, which does not dissolve finely divided glass particles. The addition of a dispersing agent is preferable to prevent the coagulation of the finely divided glass particles dispersed in said liquid medium.

For example, a preferred liquid medium can be prepared by adding 0.5 cc of a 0.01N aqueous solution of potassium carbonate into 40 cc of a mixture of ethyl alcohol and ethyl acetate in a weight ratio of 1:3. About 5 mg of finely divided glass particles having a particle size less than $1\mu$ are charged into a ball mill containing about 40.5 cc of this liquid medium and agate balls, and mixed well for 2 hours. The dispersion of this mixture is poured into a beaker which includes, at the bottom, a core member to be coated with a glass powder layer on the gap surface. The beaker is kept still for 1 day. The finely divided glass particles deposit on said gap surface by sedimentation after 1 day and form a glass powder layer 11.

A better glass powder layer 11 can be obtained by using centrifugal force during the sedimentation of finely divided glass particles. For example, an application of centrifugal force of about 2,000G for 2 or 3 min. produces a dense glass powder layer 11. The thickness of said glass powder 11 is controlled by the concentration and height of the said dispersion.

Still another and better method for making the glass powder layer 11 is to utilize an electrophoresis method which is well-known in the art.

It has been discovered according to the present invention that a better glass powder layer is obtained by using liquid medium including an aqueous solution having therein some electrolytic material, such as potassium carbonate, potassium chloride, hydrochloric acid or any other acid. Any glass composition having a softening temperature lower than 900° C can be used as a layer of glass forming the gap. Preferred glass compositions are 65 to 75 mole percent of silica, 8 to 12 mole percent of boron oxide, 5 to 7 mole percent of magnesium oxide, 8 to 12 mole percent of sodium oxide, 3 to 7 mole percent of potassium oxide and 0.1 to 1.0 mole percent of arsenic oxide. Finely divided glass particles in this composition have a softening temperature of about 850° C and are fused to make a good glass layer on the gap surface when heated at about 850° C. A ferrite magnetic head having a high resistance to wear is obtained by using a glass composition consisting essentially of, as a batch composition, 65 to 75 mole percent of silica, 7 to 12 mole percent of boron oxide, 2 to 7 mole percent of cupric oxide, 8 to 12 mole percent of sodium oxide, 3 to 6 mole percent of potassium oxide and 0 to 1.5 mole percent of arsenic oxide.

As mentioned above, said glass layer 12 performs only the function of determining the gap dimension and has no bonding action for the two head members 1 and 2. Therefore, the two head members 8 and 9 must be bonded together by using said glass bond 15. A glass composition for said glass bond 15 must have a softening temperature lower than that of said glass layer 12. Any glass composition satisfying the requirement may be used as a glass bond 15. A better result can be obtained with a glass composition consisting essentially of, as a batch composition, 54 to 60 mole percent of silica, 23 to 27 mole percent of lead oxide, 6.5 to 8.5 mole percent of sodium oxide, 1 to 3 mole percent of potassium oxide, 4 to 6 mole percent of zinc oxide, 2.5 to 4.5 mole percent of cupric oxide and 0.1 to 0.5 mole percent of arsenic oxide. This composition has a softening temperature of about 700° C and adheres to the head members 8 and 9 when fused.

The method for making a circular magnetic head core according to the present invention has various advantages as follows: (1) a precise gap dimension is obtained, because the glass layer has no bonding action and hardly dissolves the ferrite material at the gap surfaces at all. This will be explained in detail hereinafter with reference to FIG. 4. (2) The glass layer is kept free from air bubbles, because it has been formed before the two head members are joined. (3) This method can more easily prevent the segregation of α hematite from the ferrite material than the method based on capillary action, because this method is carried out at a lower temperature than the method based on capillary action. (4) This method can prevent the gap corner, particularly the apex 16 from being rounded. The rounding makes it difficult to prepare a well-defined gap. For example, if the rounded gap edges have a radius of $0.3\mu$ for a gap dimension of $1\mu$, the effective gap dimension increases about 20 percent.

Two types of magnetic heads were prepared by using a ferrite having a composition of 51 percent of $Fe_2O_3$, 25 percent of $MnO_2$, and 24 percent of ZnO. The glass composition used for the magnetic gap was as follows: 69.8 percent of $SiO_2$, 10.0 percent of $B_2O_3$, 6.0 percent of MgO, 9.9 percent of $Na_2O$, 4.0 percent of $K_2O$ and 0.3 percent of $As_2O_3$. One type of head was prepared by using the method according to the present invention. The temperature for the glass layer was 850° C and the temperature for the glass bond was 700° C. The glass bond had a composition of 57.0 percent of $SiO_2$, 24.9 percent of PbO, 7.5 percent of $Na_2O$, 1.9 percent of $K_2O$, 5.1 percent of ZnO, 3.4 percent of CuO, and 0.2 percent of $As_2O_3$. The other type was prepared by using capillary action for making the glass layer. The capillary action was carried out at 930° C so as to cause the glass melt to penetrate into the gap. The two types of magnetic heads were compared with each other with respect to the relation between the effective gap dimension and the optically observed gap dimension. The effective gap dimension governing the actual behavior of the head was determined from the shortest wavelength that can be reproduced by the head (C.D. Mee: The Physics of Magnetic Recording, North Holland Pub. Co., 1968 p. 101). The optically observed gap dimension was observed in a scanning electron micrograph.

Figure 3:
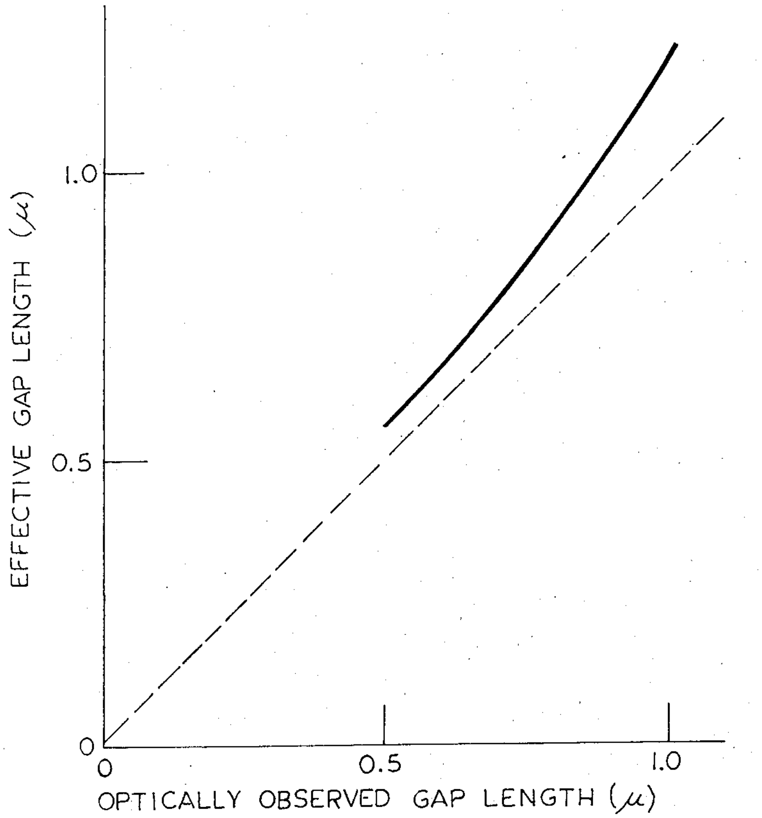
FIG. 3 is a graph showing the relation between optically observed gap length and effective gap length of a magnetic head made by the method according to the present invention.
Figure 4:
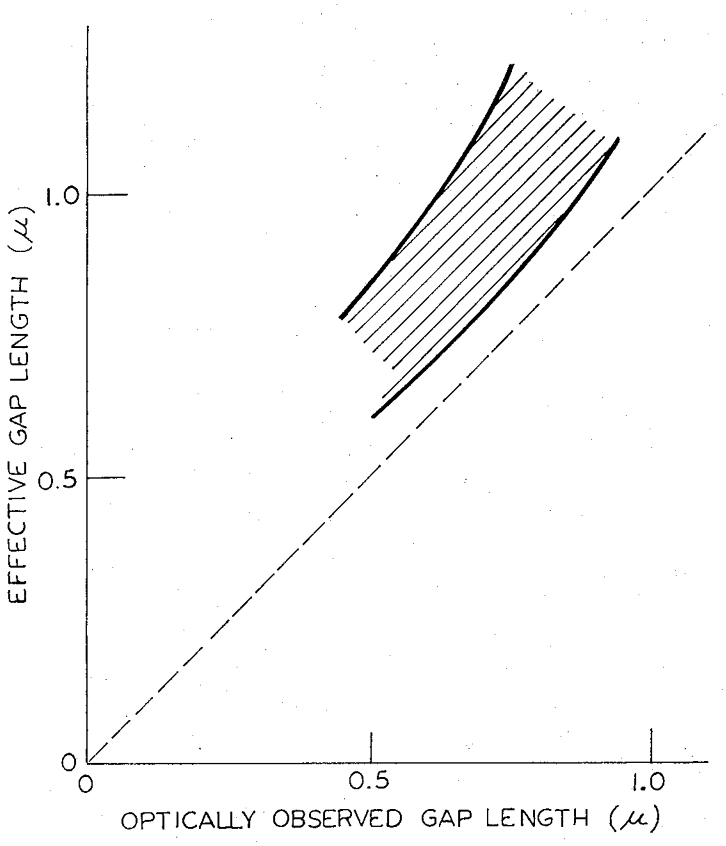
FIG. 4 is a graph showing the relation between optically observed gap length and effective gap length of a magnetic head made by a method using capillary action.

FIG. 3 indicates that the actual gap dimension of the magnetic head prepared by the method according to the present invention is in a close relation to the effective gap dimension. On the other hand, the actual gap dimension of magnetic head prepared by the method using capillary action at 930° C deviates greatly from the effective gap dimension as shown in FIG. 4. This deviation indicates that the magnetic properties of the ferrite degrade near the interface between the ferrite and the glass in the gap. The degradation can be attributed to compositional changes in the ferrite near the interface by mutual diffusion of glass and ferrite. Ferrite compositions diffuse into glass and glass ingredients into ferrite when the glass is heated at 930° C to cause flow of the glass melt into the gap by capillary action. In view of these data, it is clear that the method according to the present invention achieves a more precise gap dimension than the method using capillary action.

What is claimed is:

1. A method for making a circular magnetic head having at least first and second head members composed of ferrite and an effective gap between said members, each of said members having at least one gap surface, wherein the gap surfaces communicate with a head surface and said effective gap is filled with a glass having a first softening temperature and said head members are bonded together with a glass having a softening temperature lower than said first softening temperature comprising the steps of:

- polishing the gap surface on each of said head members;
- adhering a glass powder layer to the polished gap surface of said first head member;
- firing said glass powder layer at a glass layer forming temperature to form a glass layer which adheres to said polished gap surface of said first head member and which has a thickness substantially equal to a desired gap dimension;

- holding said first head member having the glass layer formed on the polished gap surface thereof against said second head member with said glass layer contacting the gap surface of said second head member; and then
- placing a piece of glass having a softening temperature lower than that of the glass layer on the area where said glass layer contacts the gap surface of said second head at a surface opposite to the head surface; and
- firing the two head members while said holding is being performed at a temperature lower than the glass layer softening temperature to melt said piece of glass, whereby the melted piece of glass acts, upon hardening, as a bonding agent for bonding said two head members together in the relationship in which they are held in the holding step.

2. A method for making a circular magnetic head as claimed in claim 1, wherein said glass powder layer is formed by depositing finely divided glass particles dispersed in a liquid medium on said polished surface.

3. A method for making a circular magnetic head as claimed in claim 2, wherein said finely divided glass particles are deposited on said polished surface by centrifugal force.

4. A method for making a circular magnetic head as claimed in claim 2, wherein said finely divided glass particles have a diameter of not more than 1 micron.

5. A method for making a circular magnetic head as claimed in claim 1, wherein said glass powder layer has a composition consisting essentially of, as a batch composition, 65 to 75 mol percent of silica, 8 to 12 mol percent of boron oxide, 5 to 7 mol percent of magnesium oxide, 8 to 12 mol percent of sodium oxide, 3 to 7 mol percent of potassium oxide and 0.1 to 1.0 mole percent of arsenic oxide.

6. A method for making a circular magnetic head as claimed in claim 1, wherein said piece of glass has a composition consisting essentially of, as a batch composition, 54 to 60 mole percent of silica, 23 to 27 mole percent of lead oxide, 6.5 to 8.5 mole percent of sodium oxide, 1 to 3 mole percent of potassium oxide, 4 to 6 mole percent of zinc oxide, 2.5 to 4.5 mole percent of cupric oxide and 0.1 to 0.5 mole percent of arsenic oxide.

7. A method for making a circular magnetic head as claimed in claim 2, wherein said liquid medium contains ethyl acetate, ethyl alcohol and aqueous solution of potassium carbonate as a dispersing agent.

* * * * *